June 23, 1942.   H. W. RAMEY   2,287,130
HYDRODYNAMIC BRAKE MECHANISM
Filed Feb. 26, 1941   2 Sheets-Sheet 1

Inventor
HAROLD W. RAMEY

June 23, 1942.                    H. W. RAMEY                    2,287,130
                        HYDRODYNAMIC BRAKE MECHANISM
                          Filed Feb. 26, 1941            2 Sheets-Sheet 2

Inventor
HAROLD W. RAMEY

Attorney

Patented June 23, 1942

2,287,130

UNITED STATES PATENT OFFICE 2,287,130

HYDRODYNAMIC BRAKE MECHANISM

Harold W. Ramey, Parkersburg, W. Va., assignor to The Parkersburg Rig & Reel Company, Parkersburg, W. Va., a corporation of West Virginia Application February 26, 1941, Serial No. 380,726

30 Claims. (Cl. 188—90)

This invention relates to hydrodynamic brake mechanisms for motor vehicles.

Hydrodynamic brake and similar mechanisms have been developed to a point of high efficiency and numerous efforts have been made to utilize such a mechanism in motor vehicles, particularly heavy trucks and buses, for the purpose of limiting the speed of the vehicles on long down grades without the necessity of having to use the conventional vehicle friction brakes. It is well known, that the latter brakes have a relatively short life on large motor vehicles used in hilly and mountainous regions due to the constant wearing of the brakes on long down grades and due to the destructive effects of the heat generated in the continued use of the brakes over substantial periods.

The mechanisms developed for utilizing hydrodynamic brakes with motor vehicles have been only more or less successful, some being wholly impracticable. For example, an effort has been made to utilize a hydrodynamic brake on the propeller shaft of a motor vehicle and supplied with water, when the braking action is desired, from the cooling system of the motor vehicle by tapping into a pipe connected between the engine and the water pump. With such an arrangement, a three-way valve is employed for normally directing the water from the water pump to the engine and is adapted to be turned to a position to divert water from the pump to the brake. Obviously, this arrangement prevents water from flowing to the engine and thus sometimes results in the overheating of the engine.

In another prior construction, and a far more practicable one, the hydrodynamic brake is supplied with water from the inlet side of the engine water pump but does not employ the three-way valve which prevents water from flowing to the engine. On the contrary, it governs the admission of water into the brake by means of a valved control associated with the brake itself whereby some of the water flows through the engine and some to the brake. This arrangement, therefore, is desirable over other and previous arrangements, but all prior uses of hydrodynamic brakes on motor vehicles have been disadvantageous for the reason that a substantial amount of water is required in the brake and when the brake is in operation the water level of the vehicle cooling system necessarily drops, thus causing the engine to overheat or at least to run above a preferred maximum temperature.

An important object of the present invention is to provide a hydrodynamic braking system for motor vehicles wherein the disadvantages of prior constructions referred to above are completely eliminated.

More specifically, an important object of the invention is to provide a hydrodynamic brake system for motor vehicles which utilizes the vehicle radiator as the means for cooling the liquid flowing through the brake, and wherein means is provided for preventing the level of the cooling fluid from dropping in the radiator, and thus avoiding the overheating of the motor.

A further object is to provide such a braking system wherein the normal flow of engine cooling water from the radiator to the water pump and thence through the engine water jacket is not disturbed in any way in pumping water to the brake mechanism.

A further object is to provide a braking system of the character referred to wherein the inlet pipe for the brake liquid is tapped into the vehicle cooling system between the water jacket and the vehicle radiator, the water thus flowing to the brake after it has flowed through the engine water jacket.

A further object is to provide a hydrodynamic braking system wherein an excess supply of water or other cooling and braking liquid is maintained in association with the liquid of the engine cooling system in such a manner as to provide an auxiliary liquid supply which is ample for taking care of the demands of the hydrodynamic brake without causing the liquid level in the cooling system to drop.

A further object is to provide such a system wherein the auxiliary liquid supply immediately compensates for the diminishing flow of water from the engine to the radiator when the hydrodynamic brake is brought into action, thus maintaining the water level in the radiator at the proper point.

A further object is to provide a simplified valve control for determining the rate of flow of liquid to the brake and thus to determine the degree of braking action provided thereby.

A further object is to provide a novel system which, under normal operating conditions, is closed, and wherein a relatively slight pressure is normally maintained in the system to minimize vaporization of the cooling and braking liquid, thus tending to maintain it in liquid form.

A further object is to provide novel means for returning to the liquid system any liquid which leaks from the rotor and stator pockets in the hydrodynamic brake, thus preventing the loss of liquid from the system.

Other objects and advantages of the invention will become apparent during the course of the following description.

In the drawings I have shown one embodiment of the invention. In this showing:

Figure 3 is a section on line 3—3 of Figure 2, Figure 4 is a section on line 4—4 of Figure 3, the rotor being shown in elevation, Figure 5 is a detail sectional view of the three-way brake control valve, and, Figure 6 is a fragmentary elevation showing a means for venting the brake.

Figure 1:
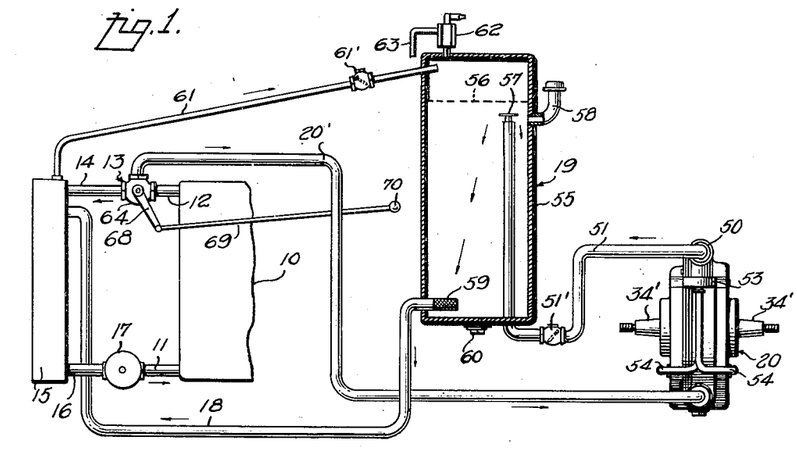
Figure 1 is a side elevation of the system as a whole shown in connection with portions of a motor vehicle, the surge tank being shown in section and parts being broken away.

Referring to Figure 1, the numeral 10 designates a portion of a conventional motor vehicle engine having the usual water jacket (not shown) to which inlet and outlet pipes 11 and 12 respectively are connected. The pipe connection 12 leads through a three-way valve 13, to be described in detail later, and thence through a pipe 14 to a radiator 15 which may be conventional except for the elimination of the usual over-flow pipe, as will be referred to later. The lower portion of the radiator is connected by a pipe 16 to a conventional circulating pump 17 from which water or other cooling liquid flows through the pipe 11 to the jacket of the engine. A pipe 18 has one end leading into the radiator adjacent the top thereof from a surge tank indicated as a whole by the numeral 19 and to be described later. The third connection of the valve 13 has one end of a pipe 20' tapped thereinto and leads to the hydrodynamic brake indicated as a whole by the numeral 20.

Figure 2:
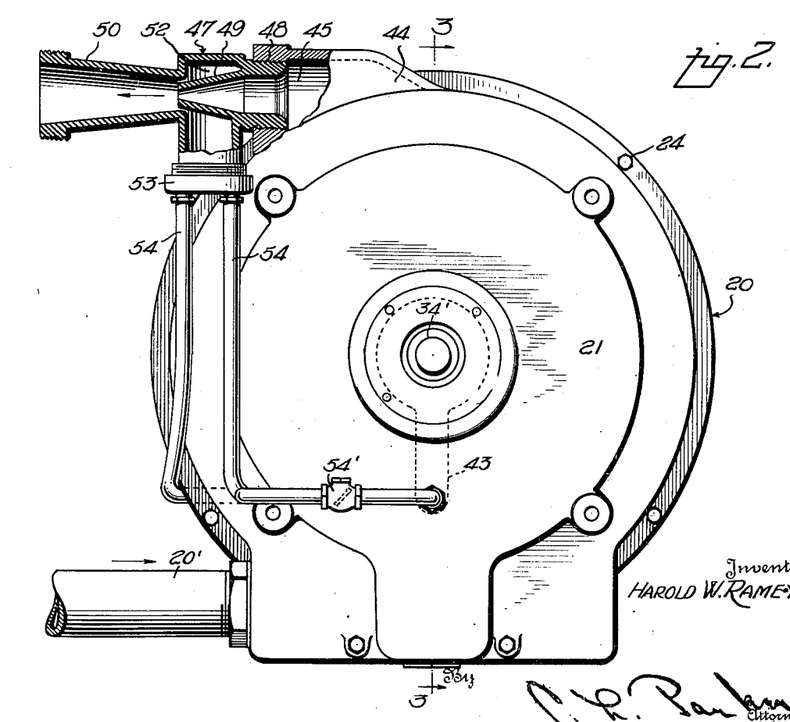
Figure 2 is a side elevation of the hydrodynamic brake, parts being shown in section.
Figures 3, 4, 5, 6:
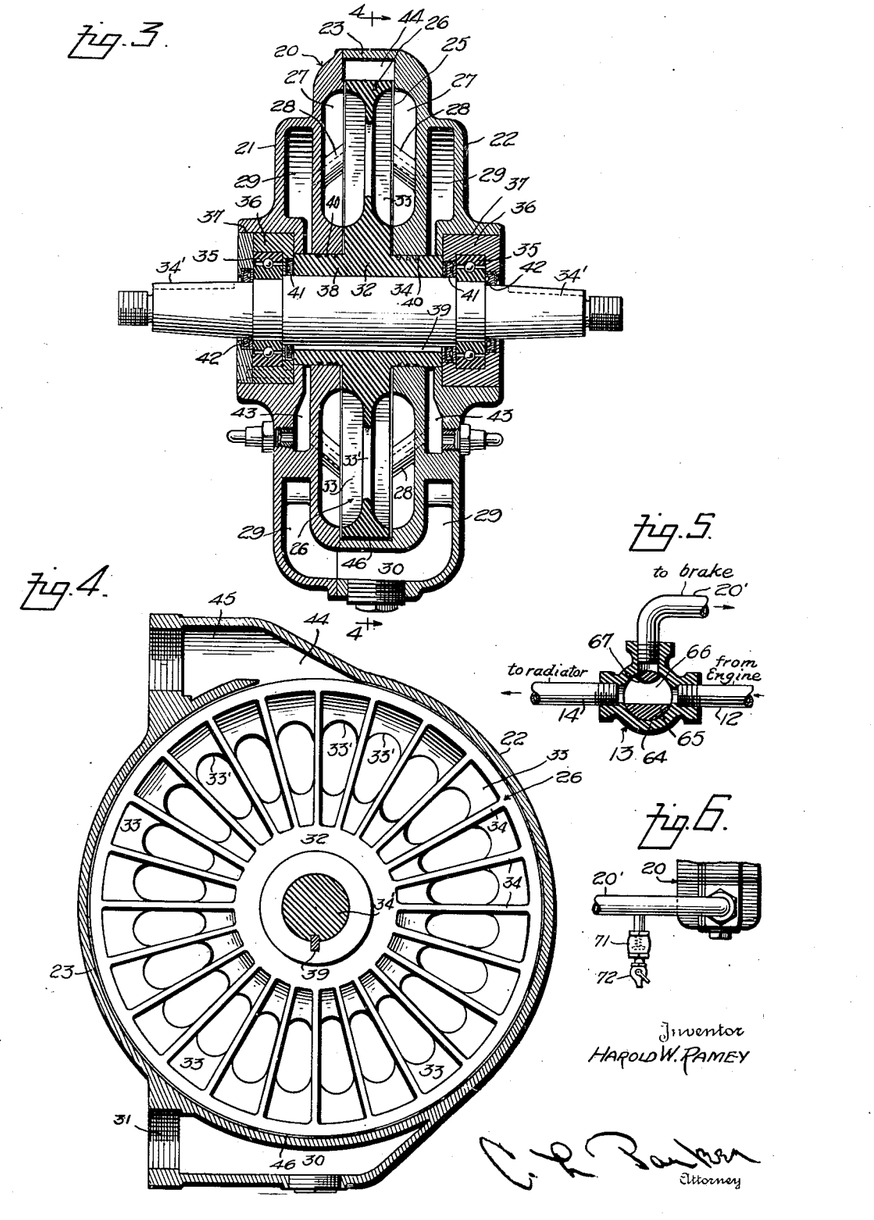

The hydrodynamic brake is shown in Figures 2, 3 and 4. Referring particularly to Figure 3, the numerals 21 and 22 designate a pair of annular casing sections which form the stator elements of the brake as will become apparent. The casing section 22 is provided with an annular flange 23 projecting toward the casing section 21 and machined to fit thereagainst, the two casing sections being secured together by bolts 24 (Figure 2). The two casing sections cooperate to form a circular rotor cavity 25 in which is arranged a rotor indicated as a whole by the numeral 26.

The casing sections 21 and 22 are provided in their inner faces with radial cavities 27 for the radial flow of liquid in accordance with the conventional operation of a hydrodynamic brake. Each casing section 21 and 22 is provided with preferably integral water inlet tubes 28, the inner edges of which terminate in the plane of the walls of the cavity 25. The outer ends of these tubes communicate with annular water pockets 29 formed in the casing sections and communicating with each other at the bottom of the brake as at 30. The liquid communicating space 30 is formed at the inner end of a tangential connection 31 (Figure 4) to which the pipe 20' is connected to supply braking liquid to the brake. It will be apparent that water flowing through the pipe 20' into the connection 31 will spread out in the connection 30 to flow into both liquid spaces 29 and thence into the hydrodynamic brake elements through the tubes 28.

The rotor 26 is arranged in the rotor cavity 25 and has parallel opposite faces provided with radial pockets 33 formed by radial vanes 34 as shown in Figure 4. The thickness of the rotor is slightly less than the width of the rotor cavity 25 so as to provide a slight clearance between the rotor and stator elements. Upon rotation of the rotor, water flows through the tubes 28 into the pockets 33. Opposite pockets 33 preferably communicate with each other through openings 33' for a purpose to be described. The tubes 28 are preferably arranged so that rotation of the rotor will induce a flow of liquid into the brake pockets. This arrangement of the tubes 28 forms no part of the present invention, being disclosed in a number of prior patents, such, for example, as Patent No. 2,113,109, granted to Robert Griffin De La Mater.

The rotor is mounted on a shaft 34' which may be connected in the propeller shaft of the motor vehicle to form a part thereof. The forward end of the shaft 34' may be directly connected to the driven shaft of the vehicle, or may be connected to the driven shaft of the auxiliary transmission arranged rearwardly of the conventional transmission in some trucks and buses. If desired, the brake unit may be substituted for the mid-ship bearing employed with many truck and bus propeller shafts. Obviously the rear end of the shaft 34' is directly connected by a shaft section to the conventional bearing differential.

The shaft 34' is rotatable in roller bearings 35 mounted in carriers 36 supported in recesses 37 formed in the respective casing sections 21 and 22 as shown in Figure 3. Between the bearings 35, the rotor 26 carries a hub 38 keyed to the shaft as at 39. The hub 38 rotates in contact with packing rings 40 to provide as nearly leak-proof joints as possible to prevent water or other liquid in the brake from escaping axially from the brake. Between each end of the hub 38 and the adjacent bearing 35 a compressible packing ring 41 is preferably arranged to prevent any leakage water from reaching the bearings. Outwardly of the bearings 35, packing rings 42 are preferably employed to prevent the entrance of any foreign material into the bearings.

The casting sections 21 and 22 are respectively provided with leakage cavities 43 wholly separate and distinct from the liquid cavities 29 and extending downwardly from the rings 38 as indicated in dotted lines in Figure 2. Accordingly it will be apparent that any leakage liquid finding its way past the packing rings 40 will gravitate into the pockets 43, and this liquid is returned to the system in a manner to be described.

As shown in Figures 2, 3 and 4, the flange 23 of the casing section 22 has formed therewithin an outlet pocket 44 communicating with a tangential connection 45 through which liquid is discharged from the brake. As previously stated, the rotor 26 is slightly narrower than the cavity 25 and an annular space 46 surrounds the rotor to receive liquid flowing through the clearance space at opposite sides of the rotor. This flow of water is fairly slow but is sufficiently rapid for the circulation of liquid through the brake so as to prevent the overheating of the liquid, particularly when water is employed. The annular space 46 communicates with the pocket 44 to discharge the water from the brake.

From the tangential connection 45 water flows through an ejector indicated as a whole by the numeral 47. The ejector has an extension 48 threaded into the extension 45 through which water flows through a nozzle 49 into an outlet extension 50 connected to one end of a pipe 51 (Figure 1) for a purpose to be described. A check valve 51' is arranged in the pipe 51 and opens away from the brake. A space 52 surrounds the ejector nozzle 49 and has its bottom capped as at 53 and communicating with the upper ends of pipes 54 leading to the respective leakage pockets 43. Each of the pipes 54 is preferably provided with a check valve 54' opening toward the ejector nozzle. Water collecting in these pockets is maintained under partial vacuum induced by the ejector nozzle 49 and accumulations of leakage water are fed into the outlet 50 and discharged therefrom together with the fluid flowing from the brake.

Referring to Figure 1, the numeral 55 designates what may be termed a surge tank through the bottom of which the pipe 51 projects preferably upwardly to a point just below the normal liquid level in the tank as indicated by the numeral 56. A baffle 57 is preferably arranged over the upper end of the pipe 51. A filling spout 58 is provided for the surge tank and this constitutes preferably the only filling spout for liquid used in the braking and engine cooling systems, as will become apparent.

As previously stated, one end of the pipe 18 communicates with the radiator 15 adjacent the top thereof and the other end of the pipe 18 extends into the tank 55 near the bottom thereof and is preferably screened as at 59 to prevent the entrance of foreign material into the pipe 18 from whence it would flow to the radiator. The screen 59 is preferably arranged slightly above the bottom of the tank 55 and the bottom wall of the tank is preferably provided with a clean-out plug 60.

In place of the usual overflow pipe, the radiator is connected to one end of a pipe 61 leading to the surge tank 55 adjacent the top thereof and the purpose of this pipe will become apparent. The pipe 61 is preferably provided with a check valve 61' opening away from the radiator 15. Provision is made for the escape of fluid from the system in the event pressure is generated above a given point and in this connection it is pointed out that the system may be, and preferably is, operated at several pounds above atmospheric pressure. Accordingly the top of the surge tank is provided with a pop-off valve 62 connected to an overflow pipe 63.

It will be noted that the brake itself is of simple construction and it need not involve any means for governing the degree of braking action between minimum and maximum. This regulation of the braking action is provided by operation of the three-way valve 13. This valve is shown in detail in Figure 5 and comprises a casing 64 having a valve plug 65 therein and a passage 66 is provided through the valve plug and normally establishes direct communication between the pipes 12 and 14, the valve plug 65 normally occupying the position shown in Figure 5 when the hydrodynamic brake is not in operation. It will be noted that the end of the passage 66 adjacent the pipe 12 is enlarged so as to be in full communication with this pipe in any position of the valve. The other end of the passage 66 is enlarged by being extended upwardly as at 67 toward the connection leading to the brake liquid supply pipe 20'. When the valve is in its normal position establishing full communication between the pipes 12 and 14, the cut away portion 67 is in a position to close the outlet opening to the brake pipe 20'. The valve is turned to a braking position by rotating the plug 65 in a clockwise direction as viewed in Figure 5, and it is obvious that the turning of the valve progressively opens the discharge port to the pipe 20' and progressively closes communication with the pipe 14. The rate of discharge will be uniform for any position of the valve plug 65, the proportionate discharge into the pipes 14 and 20' being varied in accordance with the desired braking action which will become apparent. The valve plug 65 is operated by an arm 68 from which a rod 69 leads to a handle 70 in the driver's compartment.

The brake 20 ordinarily is self-evacuating. However, when necessary to provide some means for venting the brake to empty it of water, a device such as that shown in Figure 6 may be employed wherein an inwardly opening check valve 71 is tapped into the brake inlet pipe 20' and lightly spring biased to closed position. A small pet cock 72 may be connected to the valve 71 to regulate the intake of air therethrough.

The operation of the apparatus is as follows:

During the normal operation of the motor vehicle, the three-way valve usually is arranged in the position shown in Figure 5 affording full communication between the pipes 12 and 14. Accordingly movement of liquid through the engine cooling system takes place in the usual manner, water being pumped through the pipe 11, through the engine water jacket (not shown), through pipes 12 and 14, through the radiator 15 and thence out of the radiator through the pipe 16. The usual filling spout for the radiator is either removed and the opening sealed, or the filling cap is sealed to prevent leakage. It will become apparent that except as referred to below the entire cooling system is full of liquid. As the engine becomes heated, it is obviously necessary to take care of the expansion of the liquid and accordingly an air space is provided in the highest point in the liquid system, and this point, in the form of the invention illustrated, will be the top of the surge tank 55. As the water circulates through the engine, an expansion takes place, therefore, the water can be displaced through either or both of the pipes 18 and 61 and will compress the air in the top of the surge tank. If any steam develops in the engine circulating system, or if any air is entrapped therein, it will find its way into the radiator and will flow into the surge tank through the pipe 61.

As previously stated, the pop-off valve 62 permits the accumulation of a pressure of above that of the atmosphere, and the system is preferably operated at from 4 to 7 pounds pressure above that of the atmosphere. The maintenance of some slight pressure is desirable since it elevates the temperature at which water will be converted into stream, and if water is used in the system the maintenance of pressure tends to keep the water in a liquid state. If pressure rises above the point for which the valve 62 has been set, the pressure is released and overflows through pipe 63. The lower end of this pipe is shown as being broken away and it will be obvious that it preferably extends downwardly beneath the vehicle to discharge water, steam, or air adjacent the road.

When it is desired to employ the hydrodynamic brake, for example, when the vehicle starts to descend a long grade, the operator will push forwardly on the handle 70 (Figure 1) to turn the valve plug 65 in a clockwise direction as viewed in Figure 5. This action partially closes communication between the passage 66 and pipe 14 and opens communication to the same extent with the brake pipe 20', thus diverting part of the water from the engine cooling jacket to the pipe 20' and the liquid flows through this pipe to the brake. Depending upon the braking action desired, the three-way valve may be turned in the manner stated to divert any desired proportion of the water flowing from the pipe 12 into the pipe 20'. If the maximum braking action is desirable, the three-way valve will be turned to divert all of the water into the pipe 20'.

The hydrodynamic brake is empty during the normal operation of the vehicle and thus provides no braking action whatever. As soon as water enters the brake, following the turning of the three-way valve, the braking action will be initiated. Water will flow into the chambers 29 (Figure 3) thence into the brake pockets through the tubes 28. The brake elements then operate in accordance with the well understood principles of hydrodynamic braking, the water being thrown radially outwardly by the pockets 33, due to centrifugal force, and thence flowing into the radially outer ends of the pockets 27. These pockets being stationary the circumferential inertia of the flowing water is overcome to provide part of the braking action. The continued flow of water into the radially outer ends of the pockets 27 displaces the water in these pockets radially inwardly and the water reaching the radially inner ends of the pockets 27 will flow into the corresponding ends of the pockets 33, which are rotating. At this point the second braking action comes into effect, as is well known. The operation of the brake elements need not be further referred to.

The openings 33' between the rotor pockets 33 are provided for the purpose of equalizing the amounts of liquid contained in opposite sides of the brake. These amounts might be unequal, due for example to the inertia of the moving vehicle, in which case they would provide unequal braking action. This is overcome by the provision of openings 33'.

A certain proportion of the water moving radially outwardly in the pockets 33 will constantly escape through the clearance at opposite sides of the rotor into the circumferential space 46 from which it will flow into the discharge pocket 44 and thence through the ejector 47 (Figure 2) to the pipe 51 (Figure 1) to be discharged into the surge tank 55. From the surge tank the water flows through pipe 18 back into the top portion of the radiator. The packing rings 40 (Figure 3) and compressible packing 41 serve to minimize as far as possible the actual leakage of liquid from the hydrodynamic brake and any water which leaks past the rings 40 will flow into the pockets 43 and the action of the ejector nozzle 49 serves to draw this leakage water into the ejector body to be discharged therefrom with the water flowing from the brake.

As previously stated any desired braking action between minimum and maximum may be secured by turning the three-way valve (Figure 5) to determine the proportional flow of water from the engine jacket into the pipe 20'. The flow of water through the pipe 12 always equals the flow of water from the radiator through pipe 16, this flow being determined by the operation of the pump 17. It will be apparent therefore that upon the turning of the three-way valve the flow of liquid into the radiator through pipe 14 will be less than the flow from the radiator through the pipe 16. This difference is compensated for immediately upon the turning of the three-way valve by the flow of liquid from the surge tank into the radiator through the pipe 18. The sum of the flows through pipes 14 and 18 into the radiator will equal the flow from the radiator through pipe 16, thus always maintaining the radiator 15 completely filled with water.

The surge tank 55 serves two highly important purposes, namely, to maintain an ample reserve supply of liquid so as to prevent the overheating of the liquid, and to maintain a head of liquid at the highest point in the system for a purpose to be described. The vehicle engine, of course, generates heat under all conditions, although less heat is generated when the vehicle is descending a grade. The friction generated in the hydrodynamic brake also tends to heat the liquid in the system and the reserve supply of liquid in the tank 55 increases the capacity of the system to a point wherein the conventional vehicle radiator dissipates heat sufficiently rapidly to prevent the overheating of the system.

In prior constructions it was found that upon the diverting of water from the system into the brake to provide the desired braking action, the capacity of the brake was such that the water level in the system would drop materially, thus greatly decreasing the quantity of water maintained in the radiator and consequently decreasing the heat exchanging capacity of the radiator to the point where overheating could occur. The maintenance of a quantity of liquid at the top of the system overcomes this defect, the quantity of water maintained above the top of the radiator being sufficient to permit the brake to be completely filled through the pipe 20' without lowering the level of the water below the top of the radiator. In typical installations, the capacity of the surge tank is ten gallons and two gallons of the liquid is disposed above the top of the radiator.

The capacity of the surge tank and its arrangement as to height is determined in accordance with individual installations and the system is filled with liquid solely through the filling spout 58. This spout is connected to the surge tank at such a point as to permit it to be utilized for determining the proper level of the liquid in the tank. This level is sufficiently high to accomplish the results referred to but is also sufficiently below the top of the surge tank to provide an adequate expansion space.

It will be noted that the connection of pipe 20' to the outlet side of the engine cooling jacket permits the flow of the cooling liquid to take place exactly in accordance with conventional practice when the brake is not in operation. At the same time it provides an arrangement whereby the pressure generated by the pump 17 is utilized to assist the flow of liquid through the pipe 20' to the hydrodynamic brake. While the brake itself is so constructed as to provide a self-induced flow of liquid therethrough, it is important that a continuous and adequate circulation of liquid through the brake take place to prevent overheating. In many piping arrangements the friction occurring in the pipe 20' will tend to slow down the rate of circulation through the brake and the utilization of the pressure of the pump 17 overcomes this fault.

It also will be apparent that the piping arrangements of the system are such as to provide the equivalent of a conventional flow of liquid through the cooling radiator at all times. The pipe 18 automatically operates to make up any deficiency in the rate of flow of water through the pipe 14 to the radiator when the three-way valve is opened or partially opened, and thus there is a continuous feeding of liquid to the top portion of the radiator.

The arrangement of the surge tank in the return line between the brake 20 and the radiator also is important. Assuming that a vehicle has ascended a relatively long grade and the cooling liquid is at a relatively high temperature when the top of the grade is reached, and assuming that the vehicle then starts down grade, the opening of the three-way valve diverts part or all of the water from the engine jacket to the pipe 20', whereupon cool water immediately flows from the surge tank into the radiator and through the engine to promptly lower the temperature of the cooling system, thus tending to prevent injury to the motor due to overheating. This cooling has a prompt tendency also to condense any steam which has been generated, thus tending to maintain the fluid in the system in a liquid condition.

In a test installation it has been found that the temperature in the cooling system will be promptly reduced as much as 50°, depending upon the load involved. This is due to the introduction into the cooling system of water from the surge tank, and the cooling action eliminates any erratic brake action which would occur due to the continued presence of steam in the system if the vehicle reaches the top of a grade with the liquid too highly heated. Of course, the generation of steam is minimized by the fact that the system operates under superatmospheric pressure, and accordingly numerous tests have been made under extremely adverse conditions without any failure of the hydrodynamic brake due to steam in the system.

While the surge tank has been shown as a single unit, it will be obvious that any desired arrangement may be employed by which the two main results of the surge tank may be obtained, namely, the maintenance of a substantial reserve supply of liquid, and the maintenance of a quantity of liquid above the top of the radiator to maintain the radiator filled with liquid when the brake goes into operation. For example, a smaller surge tank may be employed to hold the necessary supply of liquid above the level of the radiator, and the remainder of the excess water may be contained in an auxiliary tank located anywhere in the return line, for example, as shown in the patent to Robert Griffin De La Mater, No. 2,170,128.

The baffle 57 (Figure 1) is arranged below the level 56 of the liquid when the brake is not in operation, but when water is drained from the surge tank into the system the baffle is above the water level and serves to minimize the splashing of the water. If desired any type of baffles may be employed within the surge tank to minimize the splashing of the water therein.

The foregoing description covers the operation and advantageous features of the system as a whole over prior systems as to the arrangements and connections of the various parts. The advantage of using the hydrodynamic brake per se, of course, is obvious since it provides a fluid friction brake in which there are no wearing parts and which will limit the maximum speed of a vehicle when descending a long grade without the necessity of using the conventional vehicle friction brakes. As is well known, the braking action in a brake of this type varies as the square of the speed, and it is this fact which is utilized to provide a maximum vehicle speed under any given operating conditions of the brake. It will be obvious, of course, that the maximum vehicle speed will be progressively lowered as a progressively greater quantity of liquid is admitted into the brake since the braking action increases as the amount of liquid in the brake is increased.

The use of the check valve 61' is not essential but is preferred in order to stabilize the operation of the system and to prevent possibility of any erratic action. For example it is possible that upon the turning of the three way valve (Figure 5) to a position in which all or a substantial portion of the water from the engine cooling jacket flows to the brake through the pipe 20' while the pump 17 continues to supply water from the radiator to the engine jacket, the level of the water in the radiator may drop more rapidly than the water in the radiator is replaced through the pipe 18, in which case the tendency for the partial vacuum in the radiator would be to draw air from the top of the surge tank 19 into the radiator. Such possibility, of course, is prevented by the use of the check valve 61', air being prevented from flowing into the radiator to reduce the volume of water therein while the partial vacuum thus created causes a more rapid flow of water from the surge tank into the radiator through the pipe 18 to prevent any substantial reduction in the quantity of water in the radiator for any appreciable length of time.

The brake is placed in operation and functions in accordance with the foregoing description. When the bottom of a grade is reached the brake may be rendered inoperative merely by pulling back on the handle 10 to return the three-way valve to the position shown in Figure 5. Under such conditions a flow of liquid from the engine jacket to the radiator will exactly equal the flow of water from the radiator through the pipe 16, and accordingly no further flow of liquid from the surge tank to the radiator through the pipe 18 will occur. The self-circulating construction provided in the brake itself will then empty the brake of water. With the flow of water into the pipe 20' (Figure 5) cut off, the brake 20 will discharge the water therein through pipe 51 into the surge tank, whereupon the brake will be returned to inoperative condition. The check valve 51' obviously operates to prevent any return flow of liquid into the brake.

As stated above, the self-circulating characteristics of the brake provide for the automatic evacuation of the brake when it is cut out of operation, and this is true under most conditions. It has been found in operation that when the three-way valve is turned to the position shown in Figure 5 to render the brake inoperative, the pumping action effected in the brake will discharge a substantial quantity of the water from the brake and will permit to remain therein an insufficient quantity of water for substantial braking with no further intake of water. The result is that it normally requires only a very few seconds for the temperature of the water remaining in the brake to rise above the boiling point, whereupon the water will be converted into steam to generate pressure which substantially completes the evacuation of the brake. This is true largely under all conditions in warmer climates and is also true in colder climates where the vehicle has been in operation a sufficient length of time for the water in the cooling system of the vehicle to become heated to its normal temperature. However, in colder climates, when the vehicle is first placed in operation or has been operating an insufficient length of time for the water in the cooling system to reach substantially a normal temperature a greater length of time is required for the water in the brake to reach the boiling point and thus effect the evacuation referred to.

In Figure 6 of the drawings a device is illustrated which has been found highly efficient under the latter conditions for assisting in the evacuation of the brake, and the use of a device of this nature is preferred in colder climates. The check valve 71 is spring biased to closed position and the tension of the spring employed for this purpose may be relatively light. In some installations the frictional resistance offered to the flow of the water from the three-way valve 13 to the inlet of the brake may be such that the difference in pressure effected by the circulating pump and the reduced pressure adjacent the intake side of the brake caused by the pumping action of the brake itself may result in a pressure slightly below atmospheric pressure adjacent the check valve 71. Under such conditions, a perfectly free check valve 71 would result in admitting air into the brake. It is for this reason that the inwardly opening check valve 71 is preferably lightly spring biased to closed position.

The small pet cock 72 is preferably employed to determine the maximum flow of air into the intake side of the brake when the latter is being evacuated. It will be, obvious that when the brake is placed out of operation by turning the three-way valve to the position shown in Figure 5, the self-circulating characteristics of the brake will evacuate water from the brake through the pipe 51 (Figure 1) and this action is permitted to take place very readily by the venting of the brake through the check valve 71.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A braking system for a motor vehicle provided with a cooling fluid circulating system including a circulating pump, comprising a fluid friction brake including rotor and stator elements, a fluid inlet for the brake connected to said circulating system at such a point as to be subject to the pressure developed by the circulating pump, and means for varying the effective braking action of said brake without disturbing the circulation of cooling fluid through the engine.

2. A braking system for a motor vehicle provided with a cooling fluid circulating system including a circulating pump, comprising a fluid friction brake including rotor and stator elements, a fluid inlet for the brake connected to said circulating system at such a point as to be subject to the pressure developed by the circulating pump, and a valve for said inlet connected and arranged to control the rate of flow of fluid through the brake to vary the braking action therein, without disturbing the flow of cooling fluid through the engine.

3. A braking system for a motor vehicle having a power plant including an engine provided with a cooling fluid circulating system including a circulating pump, comprising a fluid friction brake including rotor and stator elements, a fluid inlet for the brake connected to said circulating system at such a point as to receive cooling fluid therefrom after it has passed through the engine, and a three-way valve arranged between said inlet and said circulating system to determine the proportion of the flow of cooling fluid which will pass into said inlet to thus vary the quantity of fluid in the brake and govern the degree of braking action.

4. A braking system for a motor vehicle having a power plant including a water-jacketed engine and a cooling fluid circulating system therefor including a heat exchanger, conduits connecting the engine jacket to said heat exchanger, and a circulating pump for pumping cooling fluid through one of said conduits to the engine jacket, comprising a fluid friction brake including rotor and stator elements, a fluid inlet for the brake connected to the other conduit to receive cooling fluid therefrom after it has passed through the engine jacket, and means for varying the braking action of said brake.

5. A braking system for a motor vehicle having a power plant including a water-jacketed engine and a cooling fluid circulating system therefor including a heat exchanger, conduits connecting the engine jacket to said heat exchanger, and a circulating pump for pumping cooling fluid through one of said conduits to the engine jacket, comprising a fluid friction brake including rotor and stator elements, a fluid inlet for the brake connected to the other conduit to receive cooling fluid therefrom after it has passed through the engine jacket, and valve means for determining the proportionate flow of fluid from said last named conduit to the heat exchanger and to said brake to determine the braking action of said brake.

6. A braking system for a motor vehicle having a power plant including a water-jacketed engine and a cooling fluid circulating system therefor including a heat exchanger, conduits connecting the engine jacket to said heat exchanger, and a circulating pump for pumping cooling fluid through one of said conduits to the engine jacket, comprising a fluid friction brake including rotor and stator elements, a fluid inlet for the brake connected to the other conduit to receive cooling fluid therefrom after it has passed through the engine jacket, and valve means for determining the proportionate flow of fluid from said last named conduit to the heat exchanger and to said brake to determine the braking action of said brake, said valve means comprising a three-way valve constructed and arranged to conduct all of the fluid flow to the heat exchanger or all to said brake, or to divert any portion of the flow to said brake while maintaining a uniform flow of fluid through said three-way valve.

7. A braking system for a motor vehicle having a power plant including a water-jacketed engine and a cooling fluid circulating system therefor including a heat exchanger and a circulating pump, a fluid friction brake including rotor and stator elements, fluid circulating connections for said brake including a fluid inlet for the brake connected to said circulating system at such a point as to receive cooling fluid therefrom after it has passed through said engine, said circulating system including a conduit connecting the engine jacket to said heat exchanger, a return line for conveying fluid from said brake to said heat exchanger at a point adjacent the connection of said conduit thereto, and means for varying the braking action of said brake.

8. A braking system for a motor vehicle having a power plant including a water-jacketed engine and a cooling fluid circulating system therefor including a heat exchanger and a circulating pump, a fluid friction brake including rotor and stator elements, fluid circulating connections for said brake including a fluid inlet for the brake connected to said circulating system at such a point as to receive cooling fluid therefrom after it has passed through said engine, said circulating system including a conduit connecting the engine jacket to said heat exchanger, a return line for conveying fluid from said brake to said heat exchanger at a point adjacent the connection of said conduit thereto, and means for varying the braking action of said brake by varying the amount of fluid therein, said means comprising a three-way valve for diverting to the fluid inlet for said brake a variable proportion of the fluid flowing from the engine jacket.

9. A braking system for a motor vehicle having a power plant including a water-jacketed engine and a cooling fluid circulating system therefor including a heat exchanger, fluid conduits connecting said heat exchanger to the engine jacket, and a circulating pump for pumping fluid through one of said conduits to the engine jacket, comprising a fluid friction brake including rotor and stator elements, a fluid inlet for said brake connected to the other conduit, a return line from said brake connected to said heat exchanger adjacent the point of connection of said last named conduit thereto, and means for varying the braking action of said brake.

10. A braking system for a motor vehicle having a power plant including a water-jacketed engine and a cooling fluid circulating system therefor including a heat exchanger, fluid conduits connecting said heat exchanger to the engine jacket, and a circulating pump for pumping fluid through one of said conduits to the engine jacket, comprising a fluid friction brake including rotor and stator elements, a fluid inlet for said brake connected to the other conduit, a return line from said brake connected to said heat exchanger adjacent the point of connection of said last named conduit thereto, and a three-way valve arranged between said fluid inlet and said last named conduit for diverting a variable proportion of the flow of fluid from the engine jacket to said brake to vary the braking action thereof.

11. A braking system for a motor vehicle having an engine provided with a cooling fluid circulating system including a circulating pump, comprising a fluid friction brake including rotor and stator elements, fluid inlet and return lines for the brake connected to the circulating system, means connected and arranged for varying the effective braking action of said brake by the controlled admission of fluid thereinto from said circulating system, and a tank connected in one of said lines and normally containing fluid to a level wholly above the uppermost point in said circulating system, and a vent line connected between said circulating system and said tank above the level of the fluid therein.

12. A braking system for a motor vehicle having an engine provided with a cooling fluid circulating system including a circulating pump, comprising a fluid friction brake including rotor and stator elements, a fluid inlet for said brake connected to said circulating system at such a point as to receive cooling fluid therefrom after it has passed through the engine, a return line connected between said brake and said circulating system, a tank arranged in said return line and containing liquid having a normal level wholly above the highest point in said circulating system, and a vent line connected between said circulating system and said tank above the level of the fluid therein.

13. A braking system for a motor vehicle having a power plant including a water-jacketed engine and a cooling fluid circulating system therefor provided with a heat exchanger, conduits connecting the engine jacket to said heat exchanger, and a circulating pump for pumping fluid through one of said conduits to the engine jacket, comprising a fluid friction brake having rotor and stator elements, a fluid inlet for said brake connected to the other conduit, a return line connected between said brake and said heat exchanger, a tank in said return line having a fluid level normally above the highest point in said circulating system, a vent line connected between said heat exchanger and said tank above said fluid level, and means for varying the braking action of said brake.

14. A braking system for a motor vehicle having a power plant including a water-jacketed engine and a cooling fluid circulating system therefor provided with a heat exchanger, conduits connecting the engine jacket to said heat exchanger, and a circulating pump for pumping fluid through one of said conduits to the engine jacket, comprising a fluid friction brake having rotor and stator elements, a fluid inlet for said brake connected to the other conduit, a return line connected between said brake and said heat exchanger, a tank in said return line having a fluid level normally above the highest point in said circulating system, a vent line connected between said heat exchanger and said tank above said fluid level, and means for varying the braking action of said brake by varying the amount of fluid therein, said means comprising a three-way valve connected between said last named conduit and said fluid inlet.

15. A braking system for a motor vehicle having a power plant including a water-jacketed engine and a circulating system therefor provided with a heat exchanger, and a circulating pump for circulating cooling fluid through the engine jacket and through said heat exchanger, comprising a fluid friction brake having rotor and stator elements, fluid inlet and return lines for the brake connected to said circulating system, said return line having a portion so arranged as to maintain a normal fluid level therein above the highest point in said system, a vent line connecting said heat exchanger to said portion of said return line, and means for varying the braking action of said brake.

16. A braking system for a motor vehicle having a power plant including a water-jacketed engine and a circulating system therefor provided with a heat exchanger, and a circulating pump for circulating cooling fluid through the engine jacket and through said heat exchanger, comprising a fluid friction brake having rotor and stator elements, fluid inlet and return lines for the brake connected to said circulating system, said return line having a portion so arranged as to maintain a normal fluid level therein above the highest point in said system, a vent line connecting said heat exchanger to said portion of said return line, and means for varying the braking action of said brake by varying the amount of fluid in said brake, said means comprising a three-way valve for diverting a variable proportion of the fluid flow from the engine jacket to the heat exchanger to cause it to flow through said inlet line.

17. A braking system for a motor vehicle having a power plant including an engine provided with a fluid circulating system, comprising a fluid friction brake having a casing provided with a stator element, bearings carried by said casing, a shaft mounted in said bearings, and a rotor element carried by said shaft within said brake, and inlet and return lines connected between said brake and said circulating system, and means for returning fluid leaking axially from said brake to said system at a point where relatively low pressure exists.

18. A braking system for a motor vehicle having a power plant including an engine provided with a fluid circulating system, comprising a fluid friction brake having a casing provided with a stator element, bearings carried by said casing, a shaft mounted in said bearings, and a rotor element carried by said shaft within said brake, inlet and return lines connected between said brake and said circulating system, means for returning fluid leaking axially from said brake to one of said lines at a point where relatively low pressure exists, and means for varying the braking action of said brake.

19. A braking system for a motor vehicle having a power plant including an engine provided with a fluid circulating system, comprising a fluid friction brake having a casing provided with a stator element, bearings carried by said casing, a shaft mounted in said bearings, and a rotor element carried by said shaft within said brake, inlet and return lines connected between said brake and said circulating system, and means including a device in said return line for aspirating thereinto fluid leaking axially from said brake.

20. A braking system for a motor vehicle having a power plant including an engine provided with a fluid circulating system, comprising a fluid friction brake having a casing provided with a stator element, bearings carried by said casing, a shaft mounted in said bearings, and a rotor element carried by said shaft within said brake, inlet and return lines connected between said brake and said circulating system, said casing being provided with pockets to receive fluid leaking axially from said brake, pipe connections between said pockets and said return line, and an ejector in said return line for inducing a flow of leakage fluid from said pipe connections into said return line.

21. In combination with a closed cooling fluid circulating system for a motor vehicle engine including a fluid jacket around the engine, and a heat exchanger, a motor vehicle braking system comprising a fluid friction brake having inlet and return lines connected to said circulating system, a portion of one of said lines extending above the highest point in said circulating system, a vent line connecting said circulating system to said portion of one of said lines, and a relief valve connected to said portion of one of said lines for determining the maximum pressure in said circulating system and in said braking system.

22. In combination with a closed cooling fluid circulating system for a motor vehicle engine including a fluid jacket around the engine, and a heat exchanger, a motor vehicle braking system comprising a fluid friction brake having inlet and return lines connected to said circulating system, a portion of one of said lines extending above the highest point in said circulating system, a vent line connecting said circulating system to said portion of one of said lines, a relief valve connected to said portion of one of said lines for determining the maximum pressure in said circulating system and in said braking system, and means for controlling the flow of fluid from said circulating system to said inlet line to vary the braking action of said brake.

23. In combination with a closed cooling fluid circulating system for a motor vehicle engine including a fluid jacket around the engine, and a heat exchanger, a motor vehicle braking system comprising a fluid friction brake having inlet and return lines connected to said circulating system, a tank in one of said lines containing cooling fluid to a normal level above the highest point in said circulating system, a vent line connecting said circulating system to the top of said tank, and a relief valve connected to the top of said tank for determining the maximum pressure in said circulating system and in said braking system.

24. In combination with a closed cooling fluid circulating system for a motor vehicle engine including a fluid jacket around the engine, and a heat exchanger, a motor vehicle braking system comprising a fluid friction brake having inlet and return lines connected to said circulating system, a tank in one of said lines containing cooling fluid to a normal level above the highest point in said circulating system, a vent line connecting said circulating system to the top of said tank, a relief valve connected to the top of said tank for determining the maximum pressure in said circulating system and in said braking system, and means for controlling the flow of fluid from said circulating system to said inlet line to vary the braking action of said brake.

25. In combination with a closed cooling fluid circulating system for a motor vehicle engine having a water jacket, a heat exchanger, and a pump for circulating fluid through said system, a motor vehicle braking system comprising a fluid friction brake having an inlet line connected to said circulating system at such a point as to receive cooling fluid therefrom after it has passed through the engine, a return line connecting said brake to said circulating system, a tank in said return line containing cooling fluid to a normal level above the highest point in said circulating system, a check valve in said return line between said tank and said brake to prevent a reverse flow of fluid into the latter, a vent line connecting the top of said heat exchanger to the top of said tank, and a relief valve for determining the maximum pressure in said circulating system and in said braking system.

26. A braking system for a motor vehicle having an engine provided with a cooling fluid circulating system including a circulating pump, comprising a fluid friction brake including rotor and stator elements, fluid inlet and return lines for the brake connected to the circulating system, means connected and arranged for varying the effective braking action of said brake by the controlled admission of fluid thereinto from said circulating system, and a tank connected to one of said lines and normally containing wholly above the uppermost point in said circulating system a quantity of fluid approximately equal to the capacity of said brake.

27. A braking system for a motor vehicle having an engine provided with a cooling fluid circulating system including a circulating pump, comprising a fluid friction brake including rotor and stator elements, a fluid inlet for said brake connected to said circulating system at such a point as to receive cooling fluid therefrom after it has passed through the engine, a return line connected between said brake and said circulating system, and a tank arranged in said return line and containing wholly above the highest point in said circulating system a quantity of fluid approximately equal to the capacity of said brake.

28. A braking system for a motor vehicle having a power plant including a water-jacketed engine and a circulating system therefor provided with a heat exchanger, and a circulating pump for circulating cooling fluid through the engine jacket and through said heat exchanger, comprising a fluid friction brake having rotor and stator elements, fluid inlet and return lines for the brake connected to said circulating system, one of said fluid lines having a portion so arranged as to normally contain above the highest point in said system a quantity of fluid approximately equal to the capacity of said brake, and means for varying the braking action of said brake by varying the amount of fluid therein.

29. A braking system for a motor vehicle having a power plant including a water-jacketed engine and a circulating system therefor provided with a heat exchanger, and a circulating pump for circulating cooling fluid through the engine jacket and through said heat exchanger, comprising a fluid friction brake having rotor and stator elements, fluid inlet and return lines for the brake connected to said circulating system, said return line having a portion so arranged as to maintain above the highest point in said system a quantity of fluid approximately equal to the capacity of said brake, and means for varying the braking action of said brake by varying the amount of fluid therein.

30. A braking system for a motor vehicle having a power plant including a water-jacketed engine and a circulating system therefor provided with a heat exchanger, and a circulating pump for circulating cooling fluid through the engine jacket and through said heat exchanger, comprising a fluid friction brake having rotor and stator elements, fluid inlet and return lines for the brake connected to said circulating system, one of said fluid lines having a portion arranged above the highest point in said system, a vent line connecting said heat exchanger to said portion of said last named fluid line, and a check valve in said vent line opening away from said heat exchanger.

HAROLD W. RAMEY.